United States Patent [19]

Khoshnevisan et al.

[11] Patent Number: 5,006,813
[45] Date of Patent: Apr. 9, 1991

[54] NONLINEAR OPTICAL DOPPLER IMAGING AMPLIFIER

[75] Inventors: Mohsen Khoshnevisan, Newbury Park; Pochi A. Yeh, Thousand Oaks, both of Calif.

[73] Assignee: Rockwell International Corporation, El Segundo, Calif.

[21] Appl. No.: 827,583

[22] Filed: Feb. 10, 1986

[51] Int. Cl.[5] .................... H01S 3/00; H03F 7/00; G02B 5/23
[52] U.S. Cl. .................... 330/4.3; 307/425; 350/354; 356/347; 356/5
[58] Field of Search .................... 330/4.3; 307/425; 356/347, 349, 351, 356, 360, 5; 350/354

[56] References Cited

U.S. PATENT DOCUMENTS

| | | | |
|---|---|---|---|
| 4,198,162 | 4/1980 | Bjorklund et al. | 356/349 |
| 4,390,991 | 6/1983 | Pearson | 372/21 |
| 4,413,905 | 11/1983 | Holzapfel | 307/425 |
| 4,492,468 | 1/1985 | Huignard et al. | 356/347 |
| 4,500,855 | 2/1985 | Feinberg | 330/4.3 |

Primary Examiner—Stephen C. Buczinski
Attorney, Agent, or Firm—John J. Deinken

[57] ABSTRACT

A nonlinear optical receiver includes a source of coherent light of frequency ω for illuminating a spatial region. The portion of the source light which is reflected from objects within the spatial region constitutes a signal beam. A reference beam of coherent light of frequency ω is also provided. A photorefractive element receives the signal and reference beams and amplifies the signal beam by two-wave mixing.

The receiver may include a first polarizer, having a first polarization direction, placed between a cubic photorefractive element and the signal and reference beams, and a second polarizer, having a second polarization direction perpendicular to the first polarization direction, placed so that the amplified signal beam must pass therethrough. A frequency shifting element, such as a Bragg cell modulator, is used to change the frequency of the reference beam. pa A first laser may provide both the source of coherent light and the reference beam of coherent light, or a first laser may provide the source of coherent light while a second laser provides the reference beam of coherent light. The photorefractive element may be a cubic photorefractive crystal or a nonlinear optic material. A two dimensional focal plane array may be added for detecting the amplified signal beam.

14 Claims, 5 Drawing Sheets

NONLINEAR OPTICAL DOPPLER IMAGING AMPLIFIER

BACKGROUND OF THE INVENTION

This invention is concerned with optical signal processing. The availability of lasers, which provide a coherent light output, has made it feasible to use light for transmitting and receiving information. In a laser radar system, for example, laser light is directed toward a target. The portion of that light which is reflected from the target is processed and analyzed to provide information about the size, shape, and velocity of the target. Conventional laser radars, however, are subject to certain limitations in their performance. Heterodyne receivers, for example, are typically required to obtain an adequately amplified signal. In addition, space-based applications require large optical elements. The need for accurate scanning of the primary beam over many resolution spots introduces further complexities into the system. Conventional radar systems are also vulnerable to jamming.

This invention addresses these shortcomings in the laser radar systems of the prior art, and is applicable as well to a number of other optical signal processing applications.

SUMMARY OF THE INVENTION

In general, a nonlinear optical receiver constructed according to this invention includes a source of coherent light of frequency ω for illuminating a spatial region. The portion of the source light which is reflected from objects within the spatial region constitutes a signal beam. A reference beam of coherent light of frequency ω is also provided. A photorefractive element receives the signal and reference beams and amplifies the signal beam by two-wave mixing. A frequency shifting element may be used to change the frequency of the reference beam to match that of the signal when the signal frequency is Doppler shifted by the motion of the objects.

In a more particular embodiment, the receiver includes a first polarizer, having a first polarization direction, placed between a cubic photorefractive crystal and the signal and reference beams, and a second polarizer, having a second polarization direction perpendicular to the first polarization direction, placed so that the amplified signal beam must pass therethrough. A frequency shifting element is used to change the frequency of the reference beam. The frequency shifting element may be a Bragg cell modulator. The photorefractive crystal must have cubic symmetry and is oriented to change the polarization of the signal.

A single laser may provide both the source of coherent light and the reference beam of coherent light, or a first laser may provide the source of coherent light while a second laser, phase locked with the first laser, provides the reference beam of coherent light. The photorefractive element may be a cubic photorefractive crystal or a photorefractive crystal of a lower symmetry, such as tetragonal. A two dimensional focal plane array may be utilized for detecting the amplified signal beam.

The invention also includes a method of transmitting and receiving an optical signal, which involves illuminating a spatial region with a source of coherent light of frequency ω, the portion of the source light which is reflected from objects within the spatial region constituting a signal beam. A reference beam of coherent light of frequency ω is generated and frequency shifted if required to match the Doppler shifted signal frequency. The signal beam and the reference beam are combined within a photorefractive element to coherently amplify the signal beam by two-wave mixing.

DESCRIPTION OF THE INVENTION

Figure 1:
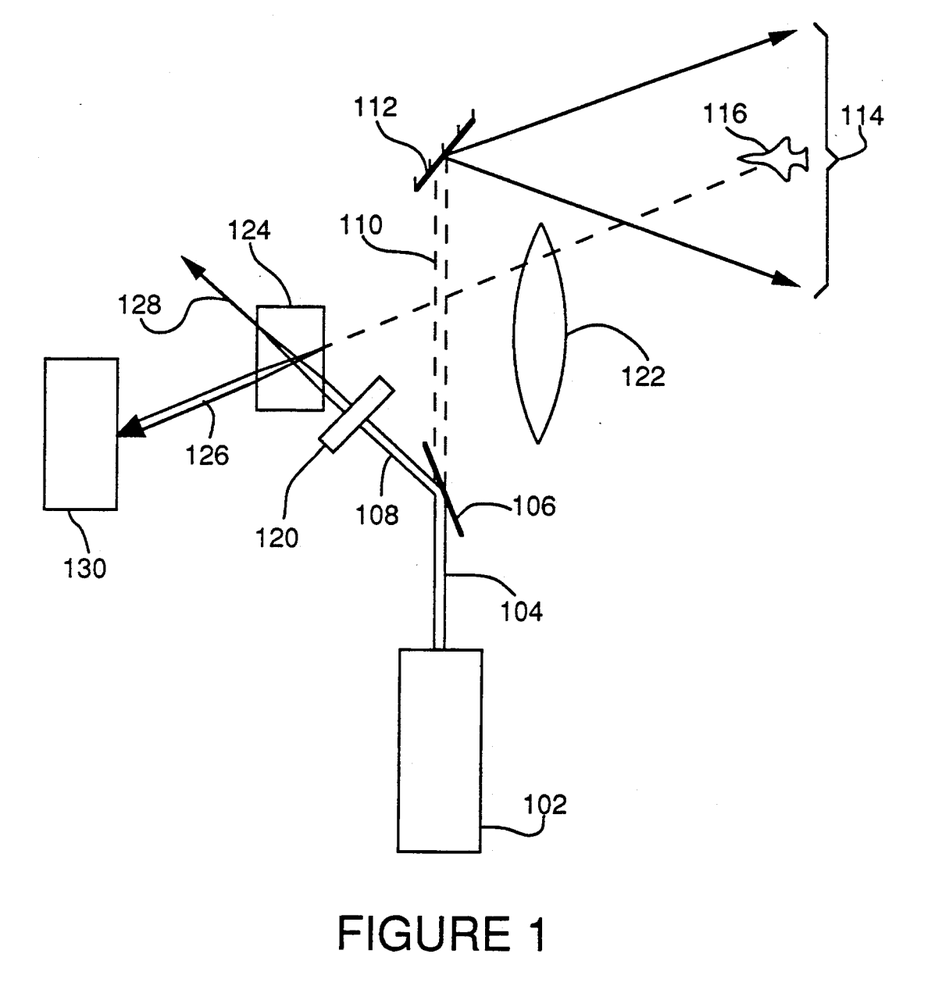
FIG. 1 is a schematic depiction of one embodiment of a nonlinear optical receiver constructed according to this invention.

One embodiment of a nonlinear optical receiver constructed according to this invention is illustrated in schematic form in FIG. 1. A highly stabilized (long coherence length) laser 102 provides an output beam 104 at a frequency ω. The beam 104 is divided by a beam splitter 106 into a reference beam 108 and an illumination beam 110. The illumination beam 110 is directed by a mirror 112 toward a region of space 114. A portion of this light is reflected from objects, such as an object 116, as a signal beam 118. The total distance travelled by the signal beam to the photorefractive crystal must be within the coherence length of the laser. A frequency shifting element, such as a Bragg cell modulator 120, may be required in order to match the frequency of the reference beam 108 to the frequency of the signal beam 118, when the signal beam is Doppler shifted by motion of the objects being observed.

The reflected signal beam 118 passes through a lens system 122 then enters a photorefractive element, such as a photorefractive crystal 124. The signal beam 118 and the reference beam 108 cross paths within the crystal, which is oriented so that a two-wave mixing process within the crystal transfers energy from the reference beam 108 to the signal beam 118 and thereby coherently amplifies the signal beam 126 transmitted by the crystal, while the emerging reference beam 128 is diminished. The amplified signal beam 126 is focussed by the lens system 122 on a two dimensional focal plane array 130 where the illuminated scene is imaged.

The photorefractive effect in electro-optic crystals has been widely studied for many applications, such as real-time holography, optical data storage, and phase-conjugate wavefront generation. Recently, increasing attention has been focussed on the utilization of the nonreciprocal energy transfer in two-wave mixing. Applications include image amplification, vibrational analysis, beam steering, and self-oscillation.

The formation of a hologram in a photorefractive medium can effect a phase shift between the light interference fringes and the refractive index modulation, provided the material is acentric. This phase shift permits a nonreciprocal steady-state transfer of energy between beams of light. Coupled mode equations can be solved in order to obtain expressions for the intensity as well as the phase of these waves. The solution indicates that the lack of phase crosstalk, which can be employed to correct wavefront distortions, is a result of real-time holography. Lack of phase crosstalk means that when a coherent signal beam is amplified by a plane wave, only energy is added to the signal beam, without affecting the image profile on the signal beam.

Figure 2:
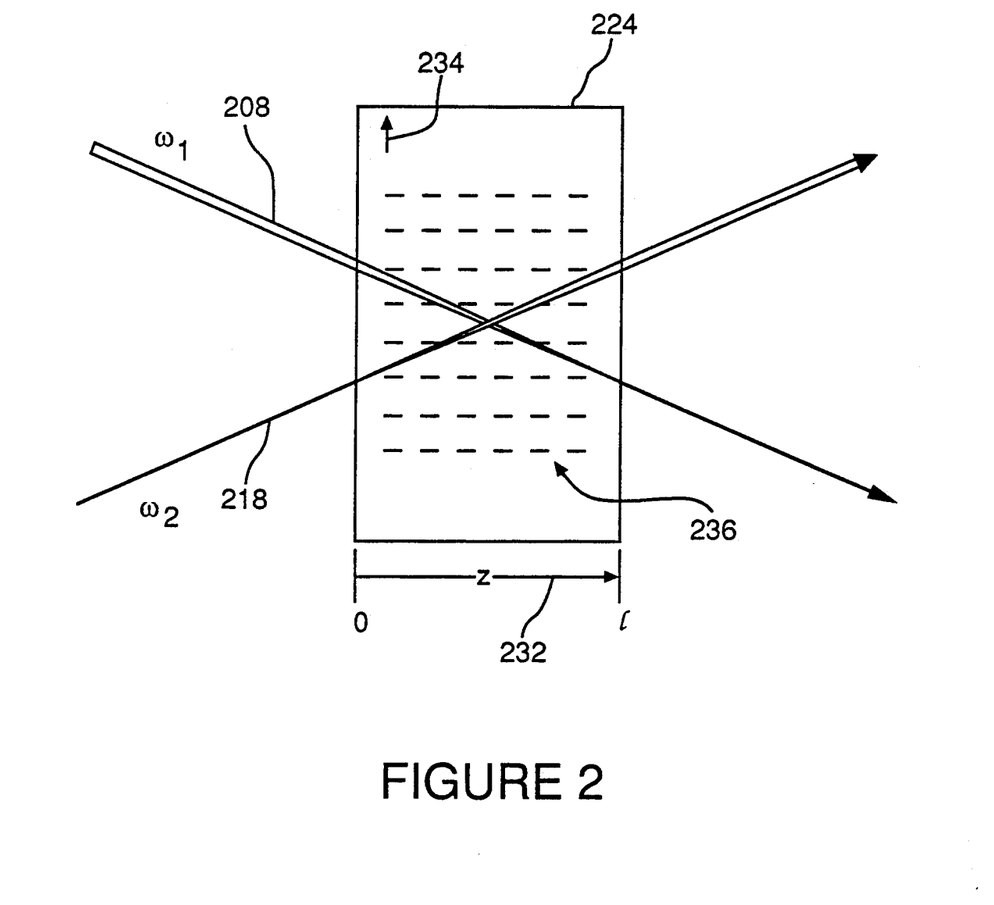
FIG. 2 indicates the two-wave mixing process in a photorefractive crystal.

Coupled mode analysis can explain the principles of operation of the present invention. FIG. 2 schematically depicts a two-wave mixing process involving a reference beam 208 and a signal beam 218 in a photorefractive crystal 224. Let the z axis 232 be oriented along the direction of the bisector of the two wave vectors. The electric field of the two waves can be written:

$$E_j = A_j(z)\exp[i(\vec{k}_j \cdot \vec{r} - \omega_j t)] + c.c. \quad j=1, 2 \tag{1}$$

where $\vec{k}_1$ and $\vec{k}_2$ are the wave vectors, $\omega_1$, $\omega_2$ are the frequencies of the waves, and c.c. denotes the complex conjugate of the preceding expression. In equation (1), it is assumed for simplicity that both waves have the same state of linear polarization and that the interference fringes are perpendicular to the c-axis 234 of the crystal. It is further assumed that no optical rotation is present in the material $A_1$ and $A_2$ are the wave amplitudes and are taken as functions of z only for the steady-state situation.

In the photorefractive medium (for $z=0$ to $\alpha$), these two waves generate an interference pattern (which is travelling if $\omega_1 \neq \omega_2$). This pattern may generate and redistribute photocarriers. As a result, a spatial charge field (which is also travelling if $\omega_1 \neq \omega_2$) is created in the medium. This field induces an index volume grating 236 via the Pockel's effect. In general, the index grating will have a finite spatial phase shift relative to the interference pattern, so that, following the notation of Fischer, et al., Amplified Reflection, Transmission and Self-Oscillation in Real-Time Holography, Optics Letters, Volume 6, Page 519 (1981)(the teaching of which is incorporated by reference), the fundamental component of the intensity-induced grating can be written as:

$$n = n_0 + (n_1/2)e^{i\phi}(A_1 A_2^*/I_0)\exp[i(\vec{K} \cdot \vec{r} - \Omega t)] + c.c. \tag{2}$$

where $$I_0 = I_1 + I_2 \equiv |A_1|^2 + |A_2|^2 \tag{3}$$

The phase $\phi$ and $n_1$ are real numbers, $\vec{K} = \vec{k}_1 - \vec{k}_2$, and $\Omega = \omega_1 - \omega_2$. Here again, a scalar grating is assumed for the sake of simplicity. The phase $\phi$ indicates the degree to which the index grating is shifted spatially with respect to the light interference pattern. According to Huignard, et al., Coherent Signal Beam Amplification in Two-Wave Mixing Experiments with Photorefractive B.S.O. Crystals, Optics Communications, Volume 38, Page 249 (1981)(the teaching of which is incorporated by reference), $\phi$ and $n_1$ can be written:

$$\phi = \phi_0 + \tan^{-1}(\Omega\tau) \tag{4}$$

$$n_1 = [2/(1+\Omega^2\tau^2)]\Delta n_s \tag{5}$$

where $\tau$ is the time constant required to build up the holographic grating, $\Delta n_s$ is the saturation value of the photo-induced index change, and $\phi_0$ is a constant phase shift related to the nonlocal response of the crystal under fringe illumination. Both parameters $\Delta n_s$ and $\phi_0$ depend on the grating spading ($2\pi/K$) and its direction, as well as on the material properties of the crystal, such as the electro-optic coefficient. Expressions for $\Delta n_s$ and $\phi_0$ can be found in Kukhtarev, et al., Holographic Storage in Electrooptic Crystals. Beam Coupling and Light Amplification, Ferroelectrics, Volume 22, Page 961 (1979)(the teaching of which is incorporated by reference). In photorefractive media (such as $BaTiO_3$) that operate by diffusion only (i.e., with no external static field), the magnitude of $\phi_0$ is $\pi/2$, with the sign depending on the direction of the c-axis.

By using equation (2) for n and the scalar-wave equation, the following coupled equations can be derived, using the parabolic approximation (i.e., assuming slowly varying amplitudes):

$$d/dz\,(A_1) = i(\pi n_1/\lambda I_0)e^{i\phi}|A_2|^2 A_1 \qquad (6)$$
$$d/dz\,(A_2) = i(\pi n_1/\lambda I_0)e^{i\phi}|A_2|^2 A_2$$

Using equation (3), the coupled equations (6) can be written as:

$$d/dz\,(I_1) = -\gamma(I_1 I_2)/(I_1 + I_2) \tag{7}$$
$$d/dz\,(I_2) = \gamma(I_1 I_2)/(I_1 + I_2)$$

where:

$$\gamma = (2\pi n_1)/(\lambda)\sin\phi$$

The solutions for the intensities $I_1(z)$ and $I_2(z)$ are:

$$I_1(z) = [I_1(0) + I_2(0)]/(1 + m^{-1}e^{\lambda z}) \tag{8}$$
$$I_2(z) = [I_1(0) + I_2(0)]/(1 + m^{-1}e^{\lambda z})$$

where m is the input intensity ratio $m = I_1(0)/I_2(0)$. Note that beam 2 is amplified (assuming $\gamma > 0$) and beam 1 is attenuated. The sum of the two beam intensities remains constant. In fact, the energy is transferred from beam 1 to beam 2. The signal g can be defined as:

$$g = [I_2(l)]/[I_2(0)] = (1+m)/(1+m\,e^{-\gamma l}) \tag{9}$$

where $\gamma$ is the coupling constant, $l$ is the length of interaction, and m is the pump/signal ratio. For $m \gg \exp(\gamma l)$, the signal gain is $g \approx e^{\gamma l}$ according to Equation 9). The theoretical maximum achievable gain, according to Equation 9), is:

$$g_{max} = 1 + m = 1 + [I_1(0)]/[I_2(0)] \tag{10}$$

which corresponds to the situation where all of the pump energy is coupled to the signal beam. In reality, this theoretical maximum cannot be fully achieved due to residual absorptions in the crystal. The value of the parameter $\gamma l$ is dictated by material properties of the crystal and the interaction length in the crystal. The above calculation assumes that absorption is very small. In the laboratory, we have shown total gains in excess of 30,000. Much higher gains can be achieved, however, assuming that the signal is weak enough (i.e., $m=[I_1(0)]/[I_2(0)]$ must be large). The upper useful limit of gain is probably set by signal to noise ratio considerations.

Figure 3:
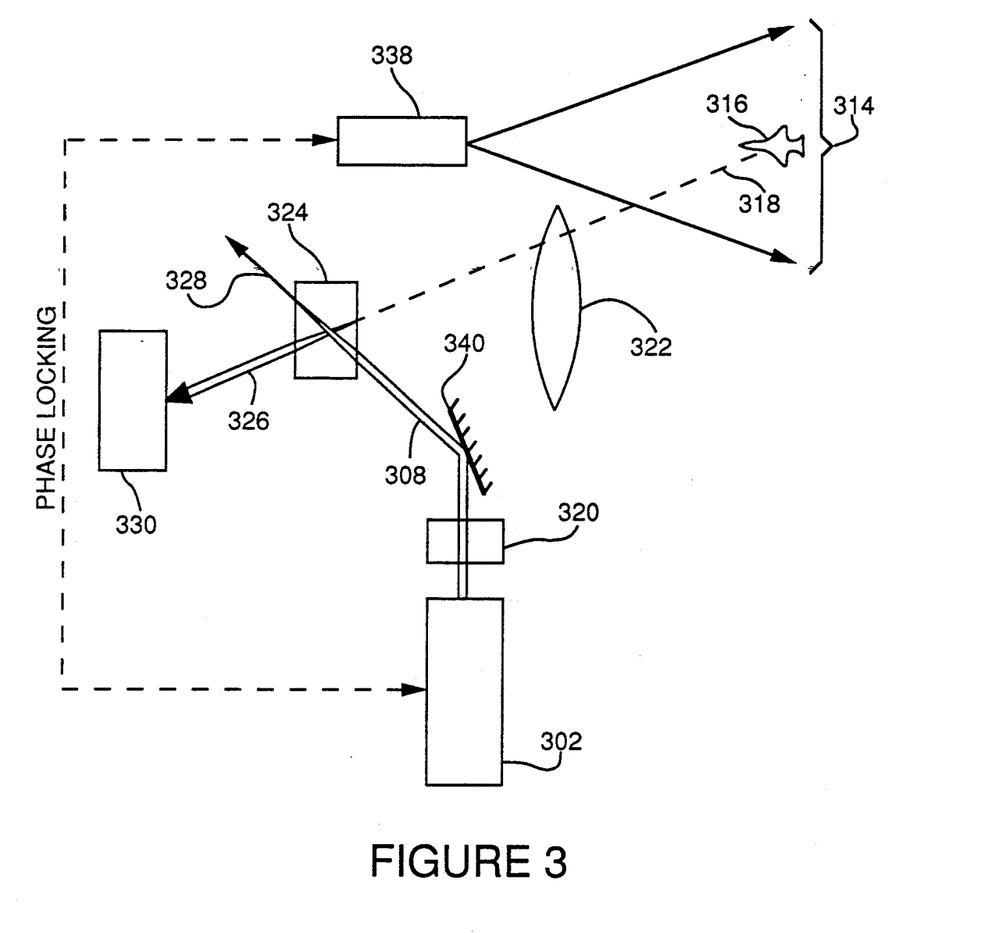
FIG. 3 illustrates another embodiment of the inventive nonlinear optical receiver.

FIG. 3 illustrates another embodiment of the invention. In this embodiment, the laser 302, the beam 304, the beam 308, the illuminated region 314, the object 316, the signal beam 318, the Bragg cell 320, the lens 322, the photorefractive crystal 324, the amplified signal beam 326, the diminished reference beam 328, and the focal plane 330 all are similar to the analogous elements in the embodiment of FIG. 1. In this version of the receiver, however, a second laser 338 provides coherent light to illuminate the region 314. The second laser must be coherently coupled with the first laser (by injection, for example) in order for the two laser outputs to stay in phase. The beam from the laser 302 is reflected by a mirror 340 to provide the reference beam 308.

Figure 4:
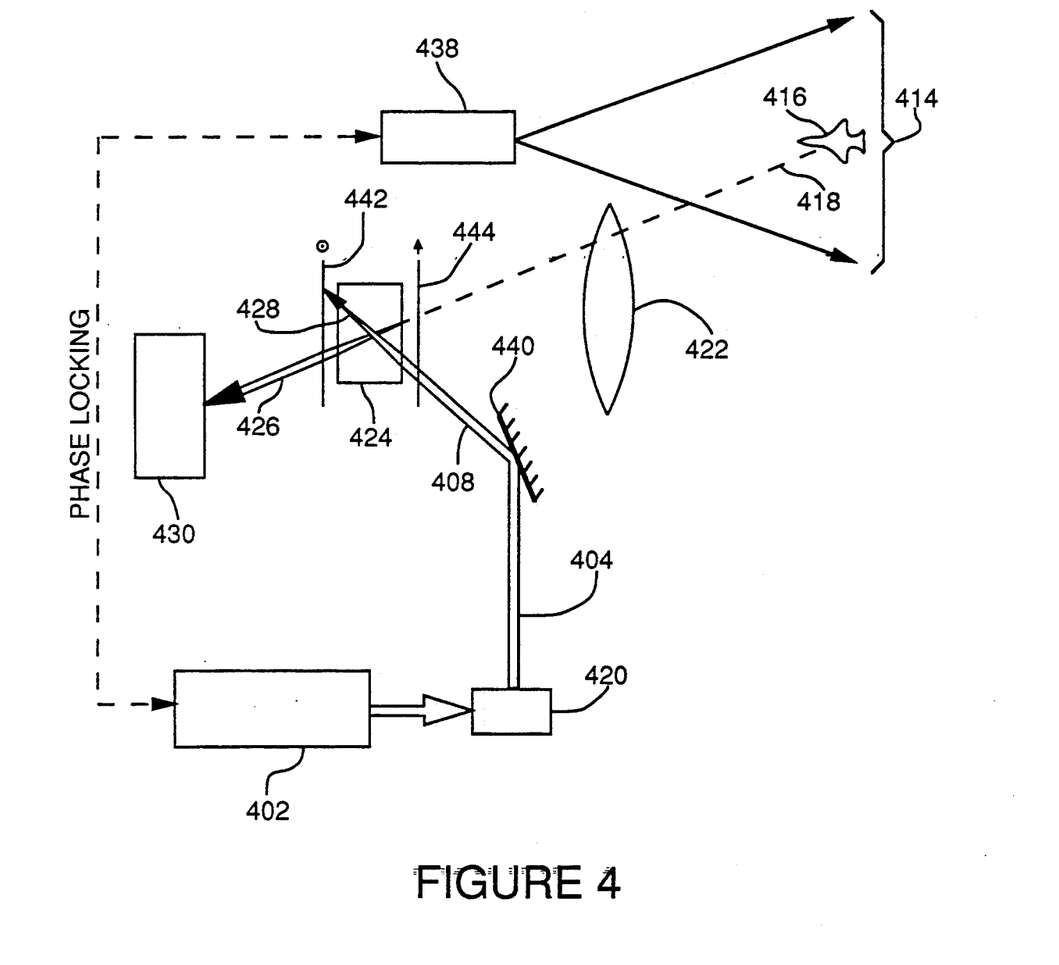
FIG. 4 is a schematic illustration of an alternative embodiment of the invention which may be used to substantially increase background rejection and to selectively view objects travelling at a predetermined speed.

FIG. 4 is a schematic illustration of another embodiment of the invention which may be used to substantially increase background rejection and still selectively view objects travelling at a predetermined speed. In this embodiment, the laser 402, the beam 404, the beam 408, the region 414, the object 416, the signal beam 418, the Bragg cell 420, the lens 422, the photorefractive crystal 424, the transmitted signal beam 426, the transmitted reference beam 428, the focal plane array 430, the second laser 438, and the mirror 440 all are similar to the analogous elements in the embodiment of FIG. 3.

The operation of the embodiment depicted in FIG. 4 may be explained by considering the wave coupling of two polarized beams in a cubic crystal (with point group $\bar{4}3m$ or 23). Each beam can have two independent states of polarization. Because of the nature of electro-optic coupling, two-wave mixing in such crystals can be arranged (by proper selection of the input polarizations) to be accompanied by a change in polarization state of the signal. Thus, by using a pair of crossed polarizers 442 and 444 surrounding the crystal, it is possible to block background radiation which does not interact with the pump beam.

According to the analysis above, particularly Equation (5), the coupling constant $\gamma$ can be written as:

$$\gamma = \gamma_0 / [1 + (\omega_2 - \omega_1)^2 \tau^2] \quad (11)$$

where $\omega_2$ is the signal frequency, $\omega_1$ is the pump frequency, and $\gamma_0$ is the coupling constant when $\omega_2 = \omega_1$. Note that efficient two-wave mixing occurs only when:

$$(\omega_2 - \omega_1) \leq 2\pi/\tau \quad (12)$$

where $\tau$ is the time constant of the photorefractive crystal.

In a laser radar application, $\omega_2$ is the frequency of the reflected wave from a moving target and is given by:

$$\omega_2 = \omega_0 + 2(v/c)\omega_0 \quad (13)$$

where $\omega_0$ is the laser frequency and v is the line-of-sight Doppler velocity of the target. For a Nd:YAG laser source and a line-of-sight target velocity of $v \approx 500$ miles/hour, the Doppler shift will be approximately 400 Mhz. The pump beam frequency $\omega_1$ can be tuned from $\omega_0$ by using the Bragg cell modulator 420. The pump beam frequency is given by:

$$\omega_1 = \omega_0 + 2\pi f \quad (14)$$

where f is the RF frequency driving the Bragg cell. Using Equations (12)–(14), the following condition is obtained for efficient coupling (Doppler scanning):

$$f - 2v/\lambda \leq 1/\tau \quad (15)$$

The maximum achievable gain for the receiver of this invention is $1+m$, as given by Equation (10). Compared with heterodyne detection, which has a gain of $\sqrt{m}$, the nonlinear optical receiver thus has the potential for gains which are several orders of magnitude higher. According to Equation (9), g is an increasing function of m, so that, for high gain operation with a fixed $\gamma l$, it is desirable to choose m as large as possible. The amplifier section of the receiver can also be cascaded, so that even higher gains are possible, up to the practical limits set by noise processes. A gain of $2 \times 10^3$ has been observed in a 1 cm×1 cm×1 cm crystal of BSO. This high gain is made possible by slightly frequency shifting one of the beams to optimize the value of $\phi$ (see Equation (4)). Larger gains can be achieved by using more efficient, larger crystals, or by using several stages in cascade.

Figure 5:
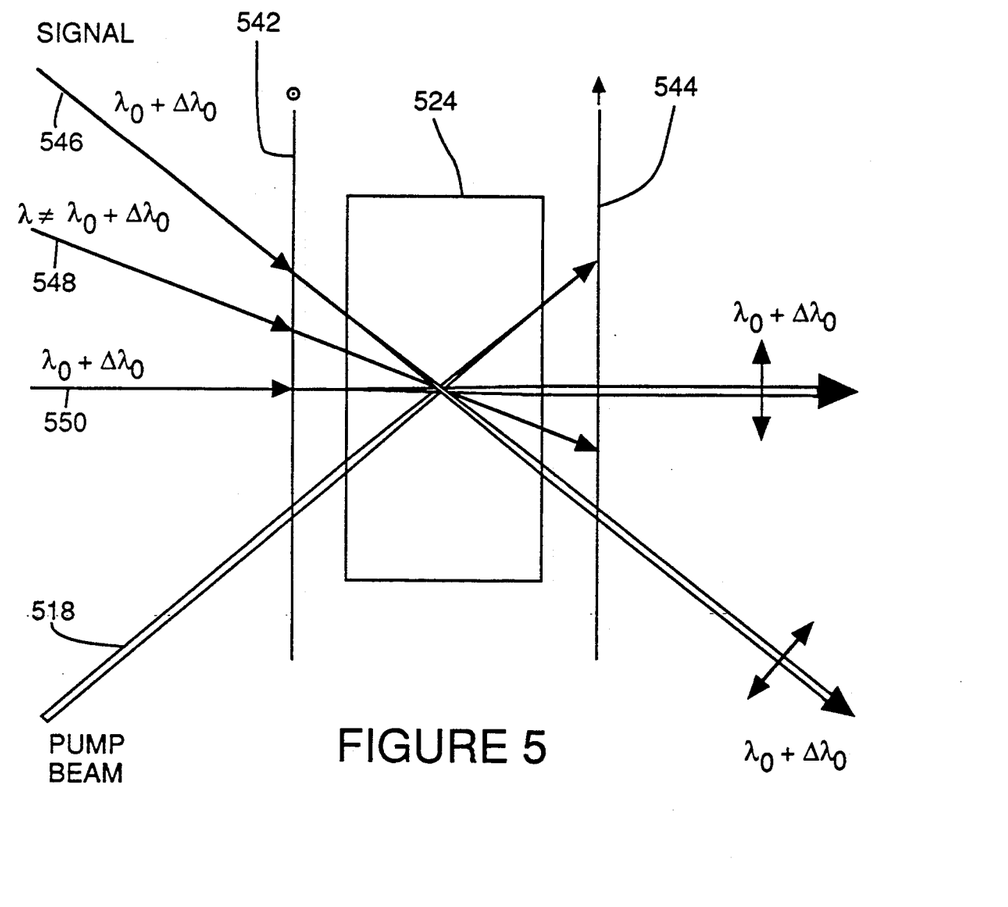
FIG. 5 illustrates how the nonlinear optical receiver of this invention exhibits a relatively large field-of-view.

The nonlinear optical receiver exhibits a relatively large field-of-view. In other words, it can receive signals and amplify them over a large acceptance angle. This is shown schematically in FIG. 5, which is a schematic diagram similar to FIG. 2 depicting the two-wave mixing process in a photorefractive crystal 524. Signals 546 and 550, which have the same wavelength as the pump beam ($\lambda_0 + \Delta\lambda_0$) but arrive with different angles of incidence, are amplified and polarization converted. Other wavelengths, such as the signal 548, are neither amplified nor passed through the analyzer. For crystals such as BSO using Ar+ laser radiation, the acceptance angle is approximately ±5°. Larger fields-of-view are obtainable if the pump beam is made noncollimated. For signals arriving from out-of-cone angles, the coupling process becomes inefficient.

Because of the narrowband nature of the nonlinear optical Doppler imaging amplifier, only signals within a certain frequency bandwidth are detected for each pump laser frequency. By modulating the frequency of the beam, it is possible to perform functions such as velocity gating or contouring.

The receiver bandwidth $\Delta\omega_{\frac{1}{2}}$ is defined as the spectral regime where signal gain is dropped from its maximum value at $\omega_2 = \omega_1$, to half-maximum value. According to Equation (12), this bandwidth is approximately:

$$\Delta\omega_{\frac{1}{2}} \approx 1/\tau \quad (16)$$

For crystals such as BSO, where $\tau = 100$ ms, this corresponds to a bandwidth of approximately 10 Hz. Equation (16) is valid only when the pump beam is monochromatic. In practice, all laser beams have a finite spectral distribution. If $\Delta\omega_p$ is the spectral width of the pump beam, the receiver bandwidth for such pumping becomes:

$$\Delta\omega_{\frac{1}{2}} \approx 1/\tau + \Delta\omega_p \quad (17)$$

Typical values for $\Delta\omega_p$ vary from less than 1 Mhz to multi-GHz. By using etalons in the laser cavity it is possible to keep $\Delta\omega_p$ much below 1 MHz. This value will determine the Doppler velocity resolution.

An additional benefit of reducing the spectral width of the laser beam is that its coherence length increases. The range of operation for the laser radar receiver which is the subject of this invention is about one half of the laser coherence length. This is necessary to keep the interacting beams in the photorefractive crystal coherent, which is required for the formation of a holographic grating, a process which is relatively slow. Current capabilities in obtaining highly stabilized laser frequencies vary, depending on the type of laser. Coherence lengths exceeding several thousand kilometers are possible, however.

By combining the nonlinear optical element with imaging optics and a focal plane array, the device of this invention is capable of tracking iso-velocity targets and rejecting other signals. This unique capability is based on the fact that photorefractive two-wave mixing preserves the direction of propagation of the signal beam. In addition, the nonlinear optical receiver is capable of simultaneously detecting multiple targets. Furthermore, since the signal is amplified, the sensitivity of the focal plane array is not an issue.

Although some typical embodiments of the present invention have been illustrated and discussed above, modifications and additional embodiments will undoubtedly be apparent to those skilled in the art. The spectral range over which this device can be operated, for example, depends on the photorefractive interaction in electro-optic crystals. For crystals such as BSO and BGO (bismuth germanium oxide), the photorefractive effect has been observed over a broad visible spectral range. Thus various visible laser lines can be used for a given crystal. Infrared-sensitive crystals are also possible, as GaAs and CdTe are potentially suitable for Nd:YAG lasers. Because of the variety of equivalents and variations which are possible, the examples presented should be considered as illustrative only and not inclusive, the following claims being more indicative of the full scope of the invention.

I claim:

1. A nonlinear optical receiver for imaging a distant moving object, comprising:
    a source of coherent light of frequency $\omega$ for illuminating the object, the portion of the source light which is reflected from the object constituting a signal beam;
    a reference beam of coherent light of frequency $\omega$;
    a frequency shifting element for changing the frequency of the reference beam to match the Doppler-shifted frequency of the signal beam; and
    a photorefractive element for receiving the signal and reference beams and coherently amplifying the signal beam by two-wave mixing, the sum of the distance between the coherent light source and the object and between the object and the photorefractive element being less than the coherence length of the coherent light.

2. The receiver of claim 1, wherein the photorefractive element further comprises a cubic photorefractive crystal positioned to change the state of polarization of the signal beam, and further comprising:
    a first polarizer, having a first polarization direction, placed between the crystal and the signal and reference beams; and
    a second polarizer, having a second polarization direction perpendicular to the first polarization direction, placed so that the amplified signal beam must pass therethrough.

3. The receiver of claim 2, wherein the frequency shifting element further comprises a Bragg cell modulator.

4. The receiver of claim 1, further comprising a first laser for providing both the source of coherent light and the reference beam of coherent light.

5. The receiver of claim 1, further comprising a first laser for providing the source of coherent light and a second laser, phase locked to the first laser, for providing the reference beam of coherent light.

6. The receiver of claim 1, wherein the photorefractive element further comprises a cubic photorefractive crystal.

7. The receiver of claim 1, further comprising a two dimensional focal plane array for detecting the amplified signal beam.

8. A nonlinear optical receiver for imaging a distant moving object, comprising:
    a source of coherent light of frequency $\omega$ for illuminating the object, the portion of the source light which is reflected from the object constituting a signal beam;
    a reference beam of coherent light of frequency $\omega$;
    a cubic photorefractive crystal for receiving the signal and reference beams, amplifying the signal beam by two-wave mixing, and changing the state of polarization of the signal beam, the sum of the distance between the coherent light source and the object and between the object and the photorefractive element being less than the coherence length of the coherent light;
    a first polarizer, having a first polarization direction, placed between the photorefractive crystal and the signal and reference beams;
    a second polarizer, having a second polarization direction perpendicular to the first polarization direction, placed so that the amplified signal beam must pass therethrough; and
    a frequency shifting element for changing the frequency of the reference beam to match the Doppler-shifted frequency of the signal beam.

9. A method of imaging a distant moving object, comprising the steps of:
    illuminating the object with a source of coherent light of frequency $\omega$, the portion of the source light which is reflected from the object constituting a signal beam;
    generating a reference beam of coherent light of frequency $\omega$;
    adjusting the frequency of the reference beam to correspond with the Doppler-shifted frequency of the signal beam; and
    combining the signal beam and the reference beam within a photorefractive element to coherently amplify the signal beam by two-wave mixing, the photorefractive element being positioned such that the sum of the distance between the coherent light source and the object and between the object and the photorefractive element is less than the coherence length of the coherent light.

10. A method of claim 9, further comprising the steps of:

placing a first polarizer, having a first polarization direction, between the photorefractive element and the signal and reference beams;

placing a second polarizer, having a second polarization direction perpendicular to the first polarization direction, so that the amplified signal beam must pass therethrough;

and wherein the step of combining further comprises:

combining the signal beam and the reference beam within a cubic photorefractive crystal to amplify the signal beam by two-wave mixing and change the state of polarization of the signal beam.

11. The method of claim 9, wherein the photorefractive element further comprises a cubic photorefractive crystal.

12. The method of claim 9, further comprising the step of:

detecting the amplified signal beam with a two dimensional focal plane array.

13. The receiver of claim 1, wherein the frequency shifting element further comprises a frequency shifting element for adjusting the frequency of the reference beam such that the adjusted reference beam frequency is equal to or greater than the absolute value of $f_4(1+2(v/c))-1/\tau$, where $f_r$ is the reference beam frequency, v is the velocity of the object, c is the speed of light, and $\tau$ is the time required to build up a holographic grating in the photorefractive element.

14. The method of claim 9, wherein the step of adjusting the frequency of the reference beam further comprises adjusting the frequency of the reference beam such that the adjusted reference beam frequency is equal to or greater than the absolute value of $f_r(1+2(v/c))-1/\tau$, where $f_r$ is the reference beam frequency, v is the velocity of the object, c is the speed of light, and $\tau$ is the time required to build up a holographic grating in the photorefractive element.

* * * * *